United States Patent
Burda et al.

(10) Patent No.: US 8,452,438 B2
(45) Date of Patent: May 28, 2013

(54) METHOD FOR MINIMIZING PRODUCTIVITY LOSS WHILE USING A MANUFACTURING SCHEDULER

(75) Inventors: Richard G. Burda, Pleasant Valley, NY (US); Heath C. Kent, Norwalk, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/445,446

(22) Filed: Apr. 12, 2012

(65) Prior Publication Data

US 2012/0203367 A1      Aug. 9, 2012

Related U.S. Application Data

(63) Continuation of application No. 12/127,972, filed on May 28, 2008, now Pat. No. 8,244,391.

(51) Int. Cl.
  *G06F 19/00* (2011.01)
  *G05B 19/00* (2006.01)

(52) U.S. Cl.
  USPC ............. 700/101; 700/28; 700/102; 700/106; 705/7.22; 705/7.37

(58) Field of Classification Search
  USPC . 700/8, 28, 29, 100, 102, 106, 111; 705/7.22, 705/7.37
  See application file for complete search history.

(56) References Cited

U.S. PATENT DOCUMENTS

| | | | |
|---|---|---|---|
| 6,907,305 B2 | 6/2005 | Mata et al. | |
| 7,058,587 B1 * | 6/2006 | Horne | 705/7.22 |
| 7,089,071 B2 * | 8/2006 | Lilly et al. | 700/100 |
| 7,184,850 B1 * | 2/2007 | Logsdon et al. | 700/100 |
| 7,684,892 B2 * | 3/2010 | Yuan et al. | 700/181 |
| 7,908,127 B2 * | 3/2011 | Weigang et al. | 703/6 |
| 2006/0271222 A1 * | 11/2006 | Lilly et al. | 700/100 |

FOREIGN PATENT DOCUMENTS

JP           1183346          7/1989

* cited by examiner

*Primary Examiner* — Jeffrey A Gaffin
*Assistant Examiner* — Douglas Lee
(74) *Attorney, Agent, or Firm* — Whitham, Curtis, Christofferson & Cook, P.C.; Parashos T. Kalaitzis

(57) ABSTRACT

Tools and/or resources which newly become available to a re-entrant flow manufacturing line, data processing pipeline or the like are allocated in substantially real time to processing operations independent of and consistent with a scheduling segment previously generated by dispatching items such as workpieces or data to tools and/or resources of a manufacturing line until the newly available tool or resource can be conveniently included in a subsequently generated schedule segment in order to avoid productivity loss due to schedule latency. Items can be dispatched in a priority order to accelerate completion of processing. A schedule segment including the newly available tool or resource can be facilitated by merging allocations of a real time dispatch list with allocations of a dispatch list corresponding to a previously generated schedule segment.

12 Claims, 5 Drawing Sheets

METHOD FOR MINIMIZING PRODUCTIVITY LOSS WHILE USING A MANUFACTURING SCHEDULER

CROSS-REFERENCE TO RELATED APPLICATIONS

This application is a continuation of U.S. patent application Ser. No. 12/127,972, filed May 28, 2008, now U.S. Pat. No. 8,244,391, issued Aug. 14, 2012.

BACKGROUND OF THE INVENTION

1. Field of the Invention

The present invention generally relates to the manufacturing of a product using a scheduler for dispatching of lots of products being manufactured to tools and other resources to be used in the manufacturing process and, more particularly, to maximize throughput of all available tools and resources.

2. Description of the Prior Art

The manufacturing of products is a major sector of the economy of many countries of the world and a wide variety of new products are developed and introduced annually. At the present time, developments in technology have led to an increase of average complexity of products while increasing the rate at which products may become obsolete. Therefore, manufacturing infrastructure such as processing pipelines, assembly lines and the like typically comprise tools and resources which are more generalized than in the past such that they can be used to carry out alternative processes and perform many diverse manufacturing operations and can be flexibly applied to the manufacture of products of widely varying types and designs including individually customized and short run products.

Both the complexity of products being manufactured and the complexity and cost of tools and resources used for manufacturing requires sophisticated scheduling, often supported by computers, for allocation of tools (such as semiconductor photolithography cells, numerically controlled machine tools, die or wire bonders, chemical-mechanical polishing devices and the like) and resources (which can include materials, intermediate products, partially processed materials or other instrumentalities such as testing or inspection equipment, data processing system peripherals, software, hardware or firmware and the like) to particular manufacturing processes in order to maintain manufacturing efficiency and to meet manufacturing schedules which are often critical and stringent.

In general, scheduling is often arranged somewhat incrementally for relatively short periods of time (e.g. several minutes, hours, days or weeks) and is performed generally in parallel with a corresponding manufacturing process. That is, the scheduling for allocation of tools and resources will be performed concurrently with execution of scheduled processes but a short period of time in advance of the corresponding manufacturing processes such that scheduling for each short period of manufacturing will be complete by the time each corresponding short period of manufacturing is to begin and determines what tools and resources will be allocated to particular manufacturing processes and workpieces, data or the like for that short period of time.

Tools and resources, of course, are subject to normal wear or needs for periodic maintenance and upgrades as well as being subject to unanticipated damage or malfunctions that require the tools or resources to be taken off-line, sometimes referred to as being "down". A tool or resource will also be unavailable for a particular process during any period it is allocated to another process. When scheduling for a period of time for a particular process is performed, only tools and resources known to be available at the beginning of scheduling can be allocated to manufacturing processes by the scheduling. Thus, if a previously unavailable tool or resource becomes available after scheduling for a period of manufacturing has begun, it will not be seen as being available until the start of scheduling for the next subsequent period of manufacturing. This delay is referred to as latency and results in the tool or resource not being productively utilized for a period of time and may compromise manufacturing throughput.

To reduce the time a given available tool or resource is not productively utilized, it has been suggested in U.S. Pat. No. 6,907,305 to update the existing schedule to reflect such occurrences. However, such an approach is not efficient or particularly effective since it requires time for modification of an existing schedule and implementation of the modified schedule to include activities associated with inclusion of the tool or resource in the schedule which may already be critical.

SUMMARY OF THE INVENTION

It is therefore an object of the present invention to provide an apparatus and method for utilization of available tools and resources which are not included in existing manufacturing schedules through provision of a real time manufacturing execution system (MES).

In order to accomplish these and other objects of the invention, a method of maximizing utilization of tools or resources in a manufacturing environment is provided comprising steps of forming a schedule for allocation during a schedule segment of tools or resources which are available at a first time, detecting availability of a tool or resource at a later time, determining work in progress which can be performed by the tool or resource which newly became available, and dispatching items, in real time, to the newly available tool or resource to perform a portion of work in progress independently of and consistent with the schedule segment.

In accordance with another aspect of the invention, a manufacturing system is provided wherein tools and resources are allocated in schedule segments in accordance with a re-entrant flow manufacturing line comprising a manufacturing execution arrangement for monitoring a tool or resource which is available but not included in a current schedule segment and a dispatcher for dispatching items to the tool or resource which is available independently of and consistent with the schedule segments.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
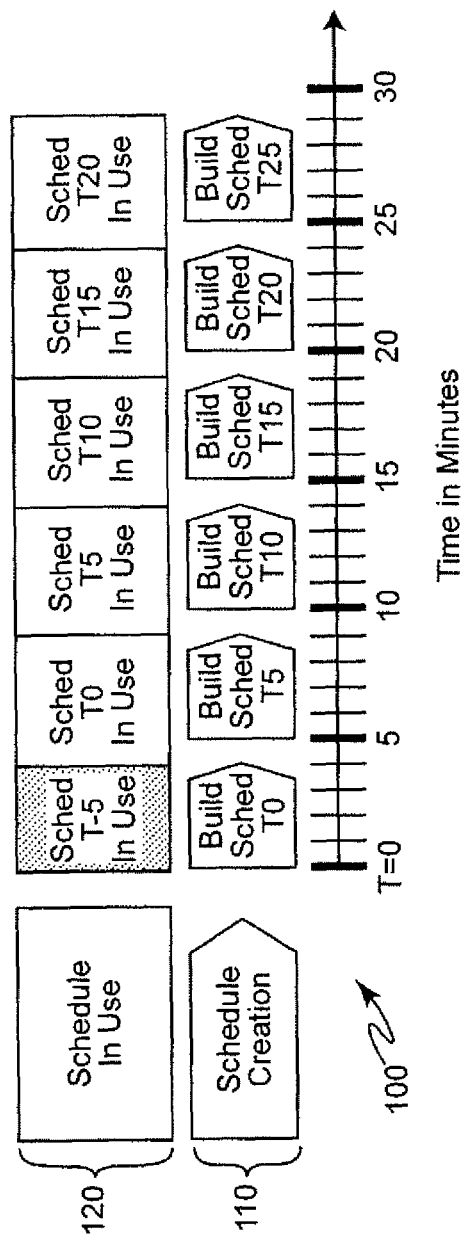
FIG. 1A is a schematic view of a time line useful for conveying an understanding of scheduling latency.

Referring now to the drawings, and more particularly to FIG. 1A, there is shown an exemplary time line 100 useful for conveying an understanding of scheduling latency to which the invention is directed. In FIG. 1A, the time scale is arbitrarily scaled in minutes as may be appropriate for highly automated high speed assembly or manufacturing procedures (or even data processing procedures which are preferentially performed on potentially specially adapted general purpose processors and/or special purpose processors, often in a pipelined fashion similar to a manufacturing line) while a time scale on the order of days or weeks may be more appropriate to heavy machinery or the like. For simplicity of illustration, the building of schedules 110 and the use of the schedules 120 so developed are performed incrementally and for equal five minute periods of time. (However, it is to be understood that such time periods may be of any duration and need not be equal.) For example, as illustrated in FIG. 1A, the building of schedule T0 begins at time T=0 while a previously built schedule (T−5) is still in use. The building of an incremental schedule segment, generally performed automatically by a scheduler engine, takes (in this case) four time units and thus utilization of that segment (T0) can begin at T=4 and continues for five minutes to T=9. Meanwhile, the building of the next schedule segment T5 begins at T=5 so that it can be completed and used beginning at T=9, and so on.

As alluded to above, scheduling can only utilize tools and resources known to be available at the beginning of the building of a particular schedule segment. Therefore, any event that occurs after T=0 but before T=5 can only be included in a schedule segment T5 built thereafter (beginning at T=5) and receives no response until the conclusion of the utilization of the schedule segment T0 at T=9 when utilization of schedule segment T5 can begin. Thus, if a tool or resource had been unavailable but again becomes available at T=1, it cannot be included in a schedule segment until T=5, at the earliest, and cannot be utilized for manufacturing until T=9 or eight minutes (or other time units) after it becomes available. Depending on circumstances which may make a particular tool or resource unavailable, such a period of non-utilization of a tool or resource (which may represent a substantial cost) may constitute a significant proportion of the time the tool or resource is available and, in any case, represents an additional although non-productive cost in the manufacturing process.

While such short term scheduling techniques may be encountered in any manufacturing line and have exhibited the seemingly unavoidable disadvantage discussed above, they are largely critical to the efficient operation of a type of processing which is becoming widespread and not limited to manufacturing processes but often encountered in data processing environments and the like. Specifically, such processing usually involves relatively small numbers of tools and/or resources; some of which are generalized to perform a relatively large number of different but related operations. Transfer of workpieces (or analogous data being processed; both of which may be collectively referred to hereinafter by the term "item" which should also be understood to comprehend a "lot" comprising one or more workpieces/items, a quantity of fungible material or goods (e.g. semiconductor wafers or chips) and/or one or more data) between tools and/or resources is not linear in such systems but is referred to as re-entrant flow such that, in general, any workpiece/item can be received by any tool or resource from any other tool or resource. Thus, a given workpiece/item may pass through and be operated upon by a given tool or resource or sequence thereof many times in the course of a manufacturing process with the given tool or resource performing a different operation on the workpiece/item during each pass through the given tool or resource. For example, a particular tool may grind a flat area on a cylindrical shaft workpiece in a first operation after which the shaft is moved to a second machine or station for another operation such as testing or inspection. Then the shaft may be returned to the first tool for drilling a hole and turning another portion of the shaft to a particular diameter whereupon the workpiece/shaft may be transferred to a third tool for heat treatment or surfacing with a material and so on.

A re-entrant flow manufacturing line organized in such a fashion provides the advantages of minimizing the number of tools and resources required for any overall manufacturing process while potentially maximizing the productive usage of each tool or resource as well as providing the possibility of providing different processing of individual workpieces/items to, for example, correct processing flaws or errors or to fabricate custom products or a short run of different products with high priority in the midst of a manufacturing run of other products. It can be appreciated that full utilization of the potential of such re-entrant manufacturing lines places a high degree of reliance on scheduling each operation on respective tools in regard to each workpiece/item and tracking the processing and movement of each workpiece/item (e.g. by control of an automatic conveyor or communication arrangement or specifically directing manual movement of workpieces/items) through the manufacturing line so that proper operations are carried out at each tool or resource. (While the distinction is not particularly important to the successful practice of the invention, workpieces/items or particular lots thereof are most accurately described as being "dispatched" to particular tools or resources while the tools or resources are most accurately described as being "allocated" to the performance of particular processes or operations on the workpiece/item or lot and the operations described below should be so understood regardless of the terminology used in the following discussion since the basic function of the processing performed by a dispatcher to carry out a schedule is basically to determine a correspondence between each tool or resource and a particular workpiece/item to be processed thereby at any point in time.)

Figure 1B:
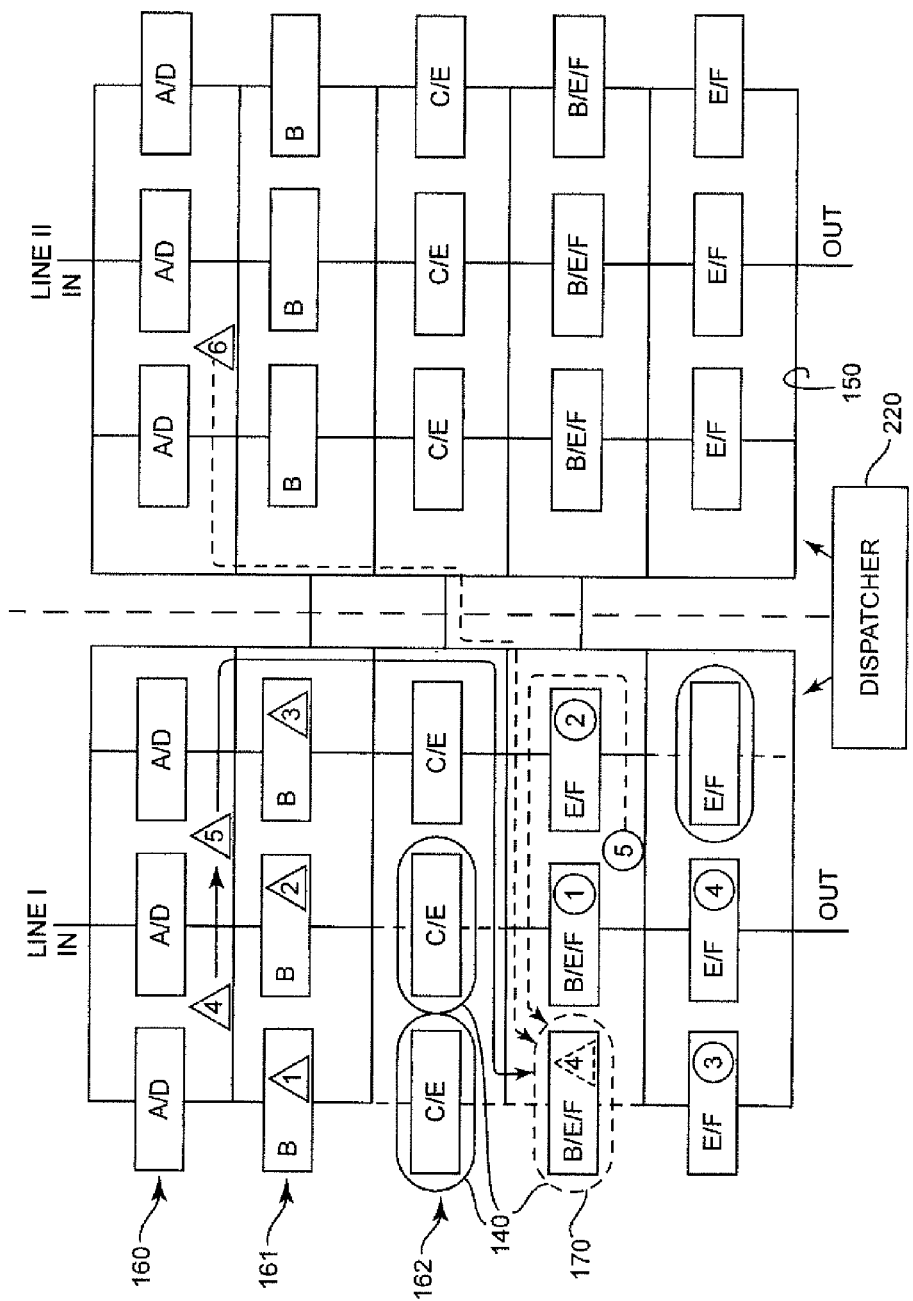
FIGS. 1B and 1C are a schematic representation of two connected re-entrant flow manufacturing lines and a partial listing of operations to be performed on each of a plurality of workpieces, respectively, which are useful in visualizing an application of the invention as well as its meritorious effects.
Figure 1C:
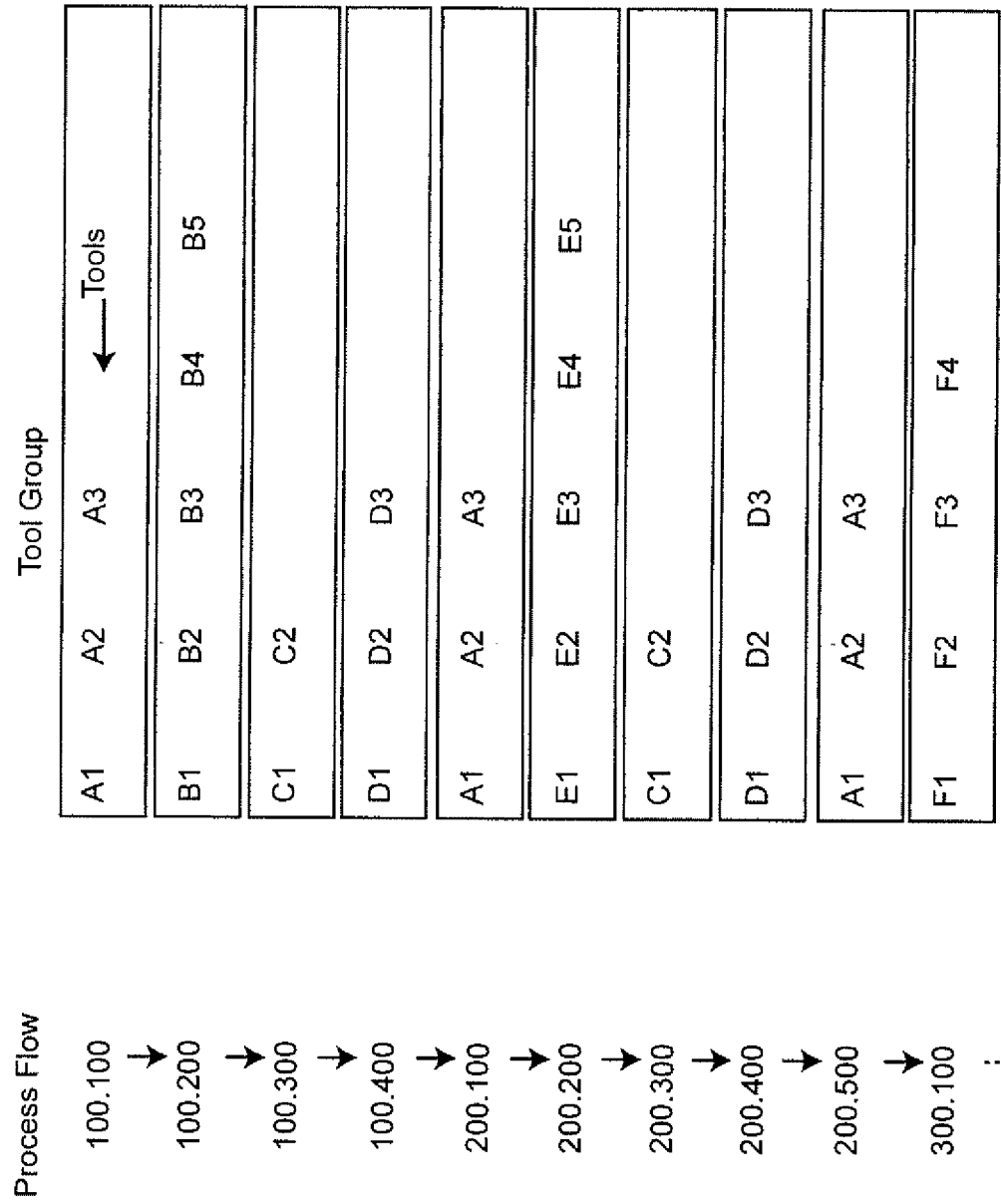

To aid in visualization of the operation of re-entrant flow manufacturing lines and the application of the invention thereto as well as the meritorious effects of the invention, particularly in such an environment, reference is now made to FIGS. 1B and 1C. FIG. 1B shows the generalized layout of two parallel re-entrant flow manufacturing lines (indicated by Roman numerals) while FIG. 1C is a table of tools or resources required for two sequences (and the start of a third sequence) of processes for manufacture of a product. Particular tools or resources are indicated by rectangles and the processes each tool is capable of performing indicated by alphabetic designations imposed thereon while particular workpieces/items are indicated by numerical designations in circles. Custom products being concurrently manufactured are indicated by triangles and, for purposes of the following description, are assumed to be "late" relative to a promised delivery time. Also, for purposes of this discussion of re-entrant flow manufacturing lines, it will be assumed that the tools and resources of lines I and II are identical and have some tools and resources "down" as indicated by (solid or dashed line) ovals. It is further assumed for purposes of this discussion that both lines have all available tools and resources fully occupied in accordance with allocations established by the dispatcher 220 which also controls a conveyor 150 that is capable of transferring the output of any tool or resource of either line to any other tool or resource of either line such that a workpiece/item is present in each tool or resource available at the beginning of any given schedule segment while others may be traveling or waiting on the conveyor. However all such workpieces/items are omitted except for circles 1-5 and triangles 1-6, for clarity. In this exemplary schedule segment, the workpieces/items represented by circles have all been processed through step 200.100 of FIG. 1C and are undergoing or waiting for step 200.200. That is, each of the workpieces/items represented by circles will have been processed, in sequence by tools or resources 160 in one or both lines (for operation A, comprising operation A1 for workpiece/item circle 1, A2 for workpiece/item circle 2 and so on) 161 (for operation B) 162 (for operation D) and again 160 (for operation D) and are now undergoing or waiting for operation E. Similarly in this schedule segment, workpieces/items represented by triangles have undergone step 100.100 and are undergoing or waiting for step 100.200. Note also that the workpiece/item represented by triangle 6 is waiting in line II, having been earlier transferred to line II when tools 160 of line I and some of line II were fully occupied with operations on workpieces/items represented by circles in step 200.100. Tool or resource 170 represents, for purposes of this example, the tool or resource which has been unavailable but becomes available during the schedule segment currently being executed and has no workpiece/item assigned to it in accordance with the schedule.

As alluded to above, updating of a schedule segment (e.g. T0) is not efficient or effective to reduce the under-utilization of a tool or resource due to scheduling latency. It can easily be appreciated from FIG. 1A that if such updating of schedule segment occurs while the schedule segment is being built, completion of the schedule segment may not be completed by T=4 and, similarly, if the updating is performed during utilization of the current schedule segment, disruption of the processing during that segment is unavoidable and may prevent execution of that schedule segment from being completed by T=9. In any event and at best, updating of a schedule segment after it is built does not provide a complete solution to tool or resource under-utilization due to latency since the tool or resource cannot be used during the schedule updating process and there is an unavoidable trade-off between the cost of such updating and the loss of productivity of the tool or resource.

The invention avoids such problems and provides for potentially full utilization of tools or resources almost immediately upon becoming available after a period of unavailability (including when a new tool or resource is brought on line for the first time) by exploiting the fact that under the conditions of a tool or resource becoming available during execution of a schedule segment after being unavailable, the scheduling already done does not reflect current conditions and that direct action can be taken in real time in regard to the change of conditions without compromising or updating an existing manufacturing schedule. That is, the invention searches for activities the tool or resource may perform without those activities being scheduled for performance on that tool or machine and thus can enhance and expedite completion of other manufacturing processes which are, in fact, scheduled and without interfering with an existing schedule until such time as utilization of the tool or resource can be included in a schedule segment.

Figure 2:
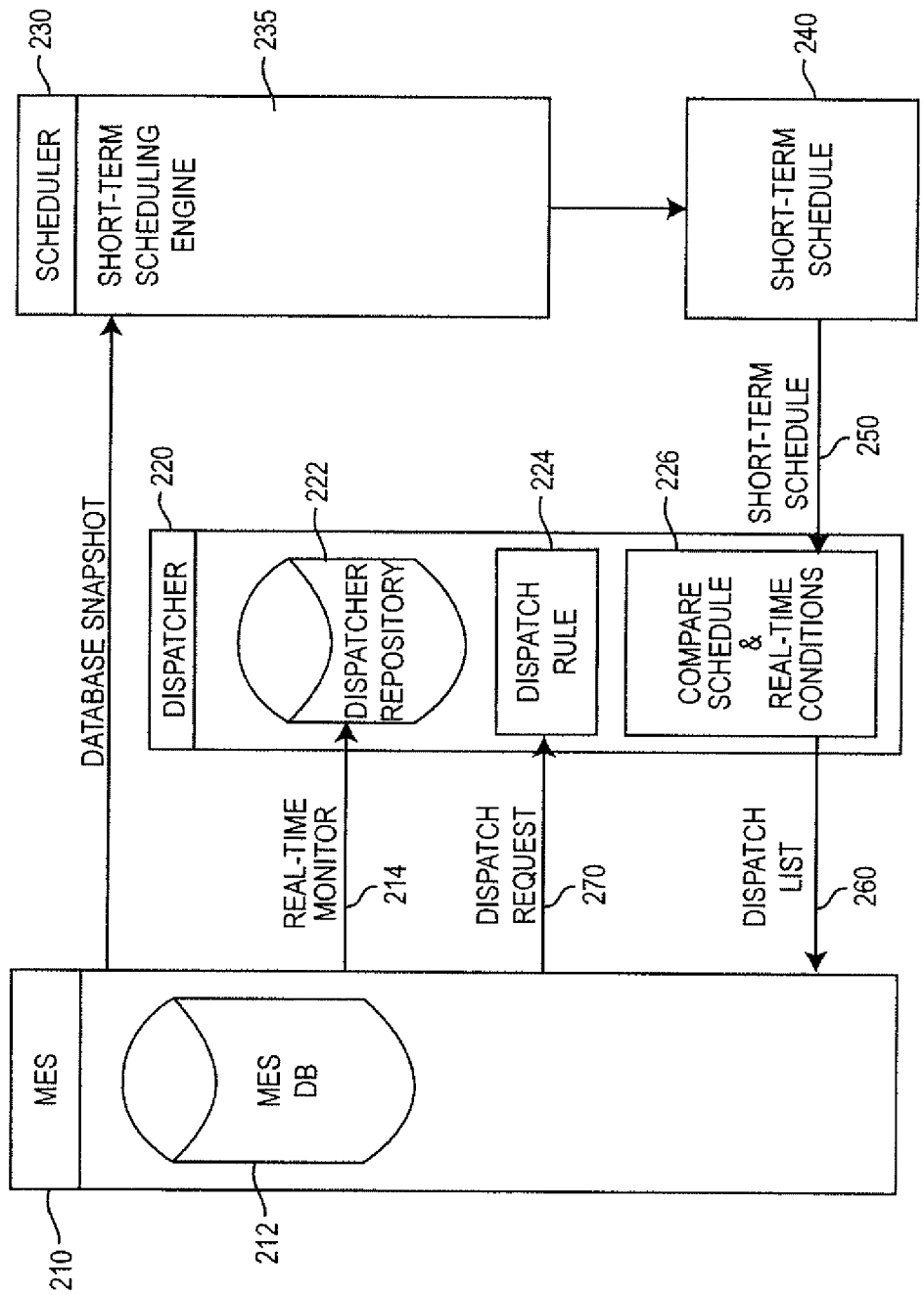
FIG. 2 is a high-level block diagram and data flow diagram of a manufacturing execution system in accordance with the invention.

FIG. 2 illustrates an exemplary data processing architecture and data flow for providing such a function. The architecture illustrated has three basic elements, a manufacturing execution system (MES) 210 including a database 212, a dispatcher 220 to provide near-real-time lot and tool assignments and for maintaining a repository of information concerning availability of tools and resources 222 and tracking of workpieces/items, and a scheduler 230 including a short-term scheduler engine 235. The dispatch repository 222 monitors the MES DB 212 of the MES 210 in real time (214). The MES DB 212 of the MES 210 provides periodic "snapshots" of available and allocated tools and resources to scheduler 230 and thus provides input for a model of the manufacturing system for the next schedule segment. Short-term scheduling engine 235 thus provides a solution in regard to tools and resources needed for the next schedule segment and the workpieces/items to be operated upon to build a short term schedule segment 240. The particulars or the schedule corresponding to a schedule segment are then provided to the dispatcher 220 which compares (226) the short-term schedule segment with real-time conditions stored in the dispatcher repository 222 and generates a dispatch list 260 which allocates tools and resources for performing the schedule segment while storing corresponding data reflecting such allocation in the dispatch repository 222.

Dispatch repository 222 preferably also contains information in regard to the availability of tools and resources including unavailability due to current allocation for a schedule segment as well as whether or not a tool or resource is "down". When a tool or resource has been unavailable but then becomes available, that change in status is recorded in the dispatch repository 222 and detected in substantially real time by a real time monitoring feature 214 of MES 210. The MES 210 then generates a dispatch request 270 to the dispatcher 220 which can then build a real time dispatch list in accordance with dispatch rule 224 as will now be discussed in connection with the flow chart of FIG. 3 to apply any unallocated tool(s) or resource(s) to work in progress (WIP) for which tools and resources may have been already scheduled in accordance with a previously built schedule segment and dispatches workpieces/items on which operations have not yet begun to the newly available tool(s) or resources(s).

Figure 3:
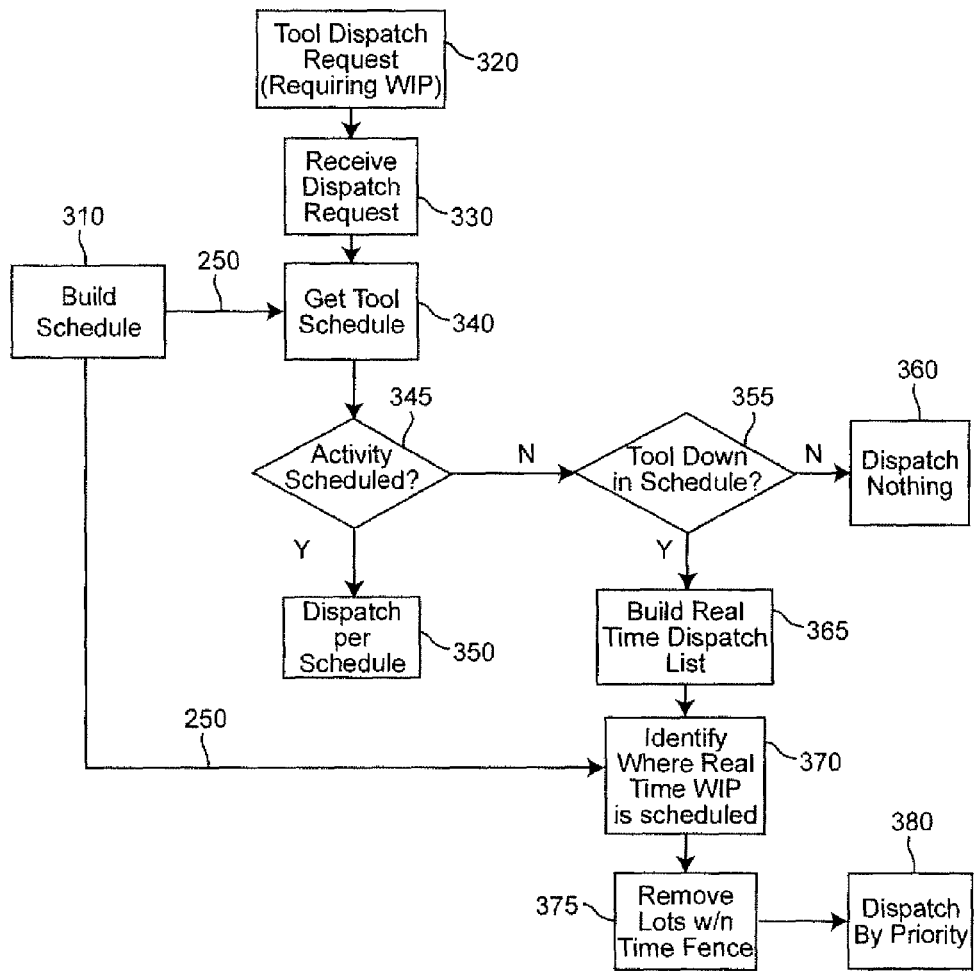
FIG. 3 is a flow chart illustrating the dispatching of tools and/or resources in accordance with the invention.

In FIG. 3, it is important to appreciate that two separate processes are occurring concurrently. That is, operation 310 indicates the processing being performed pursuant to a currently executing schedule segment developed by the scheduler engine 235 which continues as discussed above. The remainder of FIG. 3 basically illustrates the process of building a real time dispatch list to be used in conjunction with the dispatch list built in response to schedule 250 for unscheduled tools or resources in a manner consistent with operation 310 of the scheduling engine 230. It is also important to understand portions of FIG. 3 as an information flow diagram providing data for performance of different operations. Hence two separate connections 250 are depicted in FIG. 3; both of which correspond to the schedule 250 illustrated in FIG. 2 and which are thus identified by the same reference numeral.

Specifically, when real time monitoring 214 of MES 210 detects a change reflecting new availability of a tool or resource, it searches for work in progress (WIP) that can be performed by that tool or resource and forms a dispatch request 320 which is transmitted to dispatcher 220. That is, if a schedule is currently being executed, it is assumed that there is work in progress and since many tools and resources are currently somewhat generalized as alluded to above, it is likely that there will be some WIP that can be performed by a given tool or resource that has now become available. If such a match is found by MES 210, that match forms the basis of dispatch request 270.

Upon receipt 330 of the dispatch request 270 by the dispatcher 220, the dispatcher 220 interrogates current schedules for tools or resources which have been provided from scheduler 230 as the schedule is built (310). It is then determined if an activity is scheduled for such tool(s) and/or resource(s) at operation 345 and, if so, the tool(s) and/or resource(s) are dispatched in accordance with the schedule, as indicated at operation 350. If not, the process branches to operation 355 where it is determined if the particular tool or resource is "down". This performs a check on the status change detection by real time monitoring 214. If the tool or resource is, indeed, "down", nothing is dispatched, as indicated at 360.

If the tool or resource is confirmed to be available at operation 355, a real time dispatch list is built at operation 365. More than one tool or resource determined to be available may be included in such a real time dispatch list. The location of the WIP is then determined at 370, again from data stored in dispatch repository 222 from the schedule built (310) by the scheduler engine 230 and provided as indicated by connection 250. Once the location of the WIP is determined, portions (e.g. one or more lots of the item being manufactured) of the manufacturing process work during a schedule segment currently being executed or scheduled to be executed and within the time boundary or "fence" allocated for completion of that schedule segment can be removed and allocated to the tool(s) or resource(s) in the real time dispatch list generated at operation 365 in order of priority or the like, as indicated at 380 without compromising the schedule segment already built but providing for earlier completion of the operations therein.

In accordance with the invention, priority among such workpieces/items or lots may be based on any of a number of factors included in priority rule 224 such as the priority for delivery of one or more particular workpieces/items (e.g. those represented by triangles in FIG. 1B which were assumed to be "late"), workpieces/items which are waiting because of a tool or resource which is "down (e.g. circle 5 in FIG. 1B), if a particular operation can be performed more quickly on a particular tool (e.g. because of a prior operation using the same settings or parameters), number of workpieces/items waiting for the same operation (e.g. triangles 4 and 5 of FIG. 1B) or to return a given workpiece/item to a preferred line (e.g. triangle 6 in FIG. 1B). As illustrated in FIG. 1B, the real-time schedule developed by the invention can allocate any or all of the waiting workpieces/items, in sequence, depending on priority rules 224, to tool or resource 170 via conveyor 150 as depicted by solid or dashed arrows and process as many of them as possible during the remainder of the current schedule segment. Any workpieces/items not reached by tool or resource 170 by the end of the current schedule segment will be scheduled in due course in the next segment with tool or resource 170 being allocable in the normal manner.

Thus it is seen that productive use can be made of available tools and/or resources as they become available and in real time without the processing overhead of updating a schedule to include them (or otherwise compromising or interfering with an existing schedule segment) while actually accelerating the completion of scheduled manufacturing processes. Further, the use of the real time dispatch list can be continued with the same meritorious effect until the use of the tools or resources can be conveniently scheduled and the allocation performed in the normal manner and need not necessarily be scheduled in the next schedule segment for which the tool or resource is available (since the tool or resource can be fully utilized without being included in a given schedule segment) although including the tool or resource in the next segment for which it is available would be a more normal mode of operation of the invention.

Moreover, the scheduling may be facilitated in many instances simply by merging the real time tool and/or machine allocations of the dispatch list into the tool and/or resource allocations of the dispatch list corresponding to a prior schedule segment. Thus, the building of a schedule segment may also be accelerated through use of the invention to substantially correspond to the acceleration of the execution of the scheduled processing.

It should also be appreciated that while the invention may be applied to a single group of manufacturing processes or even a single process, it may be even more effectively applied in environments where a plurality of manufacturing lines or groups of manufacturing processes are being performed within a single facility. Essentially, such a facility or environment will generally have a greater variety of work in progress at any given time making the finding of a match to the capabilities of the newly available tool or resource much more likely.

In view of the foregoing, it is clearly seen that the invention provides an apparatus and method where direct action can be taken in regard to changed conditions of availability of tools and resources in manufacturing environment without the requirement for updating of schedules or segments thereof or incurring the inefficiencies of doing so. While scheduling provides a key link to optimization of throughput for given tools and resources, gaps in utilization of tools and resources can be avoided and allowing throughput to be fully maximized as has not been possible heretofore.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of maximizing utilization and minimizing latency of tools or resources in a manufacturing environment, said method comprising steps of forming a schedule for allocation, during a schedule segment, of tools or resources which are available at a first time, detecting availability of a tool or resource at a second time later than said first time which was not available at said first time while said schedule segment is being executed, determining work in progress that is awaiting use of a tool or resource which was determined to be available at said first time but which can be performed by said tool or resource which became available at said second time, and dispatching items, in real time, to said tool or resource which became available at said second time to perform a portion of said work in progress independently of and consistent with said schedule segment between said second time and the beginning of another schedule segment which includes said tool or resource that became available at said second time.

2. A method as recited in claim 1, including the further step of monitoring, in real time, the availability of tools an resource for processing of items.

3. A method as recited in claim 2, including the further step of issuing a dispatch request upon detection of new availability of a tool or resource.

4. A method as recited in claim 1, wherein said dispatching step dispatches items in order of priority.

5. A method as recited in claim 4 wherein said priority is in order of at least one of the priority for delivery of one or more particular items, items which are waiting because of a tool or resource which is "down", if a particular operation can be performed more quickly on a particular tool, number of items waiting for the same operation or to return a given item to a preferred line.

6. A method as recited in claim 1, wherein said step of forming a schedule forms a first schedule segment, said method including the further step of forming a second schedule segment.

7. A method as recited in claim 6, wherein said second schedule segment includes allocation of said tool or resource that became available at said second time.

8. A manufacturing system wherein tools and resources are allocated in schedule segments in accordance with a re-entrant flow manufacturing line, wherein latency of said tools or resources is reduced without modification of an existing schedule segment, said manufacturing system comprising means for monitoring a tool or resource which becomes available but is not included in a current schedule segment, and means for dispatching items awaiting work by a tool or resource included in said current schedule segment to said tool or resource which can perform a scheduled operation on said item and becomes available during said current schedule segment but is not included in said current schedule segment to perform said scheduled operation on said items dispatched to said tool or resource independently of and consistent with said schedule segment.

9. The system as recited in claim 8, wherein said means for dispatching includes means for determining priority among items which can be dispatched.

10. The system as recited in claim 9, wherein said priority is based on at least one of the priority for delivery of one or more particular items, items which are waiting because of a tool or resource which is "down", if a particular operation can be performed more quickly on a particular tool, number of items waiting for the same operation or to return a given item to a preferred line.

11. The system as recited in claim 8, further including a scheduling engine for generating said schedule segments.

12. The system as recited in claim 11, wherein said scheduling engine generates a schedule by merging allocation of tools or resources to which items are dispatched by said dispatching means with a prior schedule segment.

\* \* \* \* \*